US006384409B1

(12) United States Patent
Libbey, III et al.

(10) Patent No.: US 6,384,409 B1
(45) Date of Patent: May 7, 2002

(54) OPTICAL TRACKING SYSTEM

(75) Inventors: Miles Augustus Libbey, III, Pennington, NJ (US); Randall Eugene McCoy, McConnellsburg, PA (US)

(73) Assignee: MQS, Inc., Jamesburg, NJ (US)

( * ) Notice: Subject to any disclaimer, the term of this patent is extended or adjusted under 35 U.S.C. 154(b) by 0 days.

(21) Appl. No.: 09/295,693

(22) Filed: Apr. 21, 1999

Related U.S. Application Data

(60) Provisional application No. 60/082,632, filed on Apr. 22, 1998.

(51) Int. Cl.[7] .................................................. G06K 7/12
(52) U.S. Cl. ..................... 250/271; 250/458.1; 235/468
(58) Field of Search ............................. 250/271, 458.1, 250/459.1, 461.1, 462.1; 283/92; 235/468; 106/31.15

(56) References Cited

U.S. PATENT DOCUMENTS 3,946,203 A * 3/1976 Hecht et al. ............. 250/458.1
4,485,308 A * 11/1984 Rabatin .................... 250/461.1
4,605,849 A * 8/1986 Klien et al. .................. 250/216
5,525,748 A * 6/1996 Berson et al. .............. 250/271

* cited by examiner

*Primary Examiner*—Georgia Epps
*Assistant Examiner*—Richard Hanig
(74) *Attorney, Agent, or Firm*—MCS&G, P.A.

(57) ABSTRACT

An optical system for the tracking or verification of items, having an energy source (e.g., an illumination source), selectively producing a specific wavelength (or small set of wavelengths, such as a spectrum) of energy matched with a material sensitive to that illumination. When the material is subjected to the energy source, it emits a wavelength of energy which is then sensed by a detector.

7 Claims, 2 Drawing Sheets

EXEMPLARY WAVELENGTH CASCADE EFFECT

OPTICAL TRACKING SYSTEM

This application claims the benefit of U.S. Provisional Application Ser. No. 60/082,632, filed Apr. 22, 1998.

BACKGROUND

Tracking and verification of products is critical to many businesses and service industries. Companies are continually looking for increasingly effective methods for tracking their products. Moreover, counterfeiting of goods, and importation of so-called "gray-market" goods threaten a company's ability to maintain effective control and tracking of its products.

SUMMARY OF THE INVENTION

The invention relates to an optical system for the individual tracking or verification of a variety of items. This tracking system may be used in manufacturing, distribution, warehouses, or retail locations for inventory control as well as tracking, sorting, validating or counting specific items such as casino chips or tokens, hardware items, computer diskettes and CD-ROMs, VCR tapes, perfumes, pharmaceutical products, alcoholic products, clothing labels, identification (ID) tags for personnel, and the like. This system may also be used to track and verify pharmaceutical items and packaging, luggage, and manufactured goods or shipments (such as UPS, FedEx, Airborne, DHL, or U.S. Mail items). This system may further be used as a quality control system such as returned goods, or determining counterfeit stock.

The invention selectively matches a particular wavelength (or small set of wavelengths, such as a spectrum) of light or other energy produced by an illuminator (or illumination source), with a material which is sensitive to that illumination. This material is placed, printed, or applied to an object sought to be identified or tagged. When a reading or verification is desired, the special illuminator at the specified wavelength (or wavelength spectrum) is used to excite the material, making it visible to a detector.

DETAILED DESCRIPTION OF THE INVENTION

Figure 1:
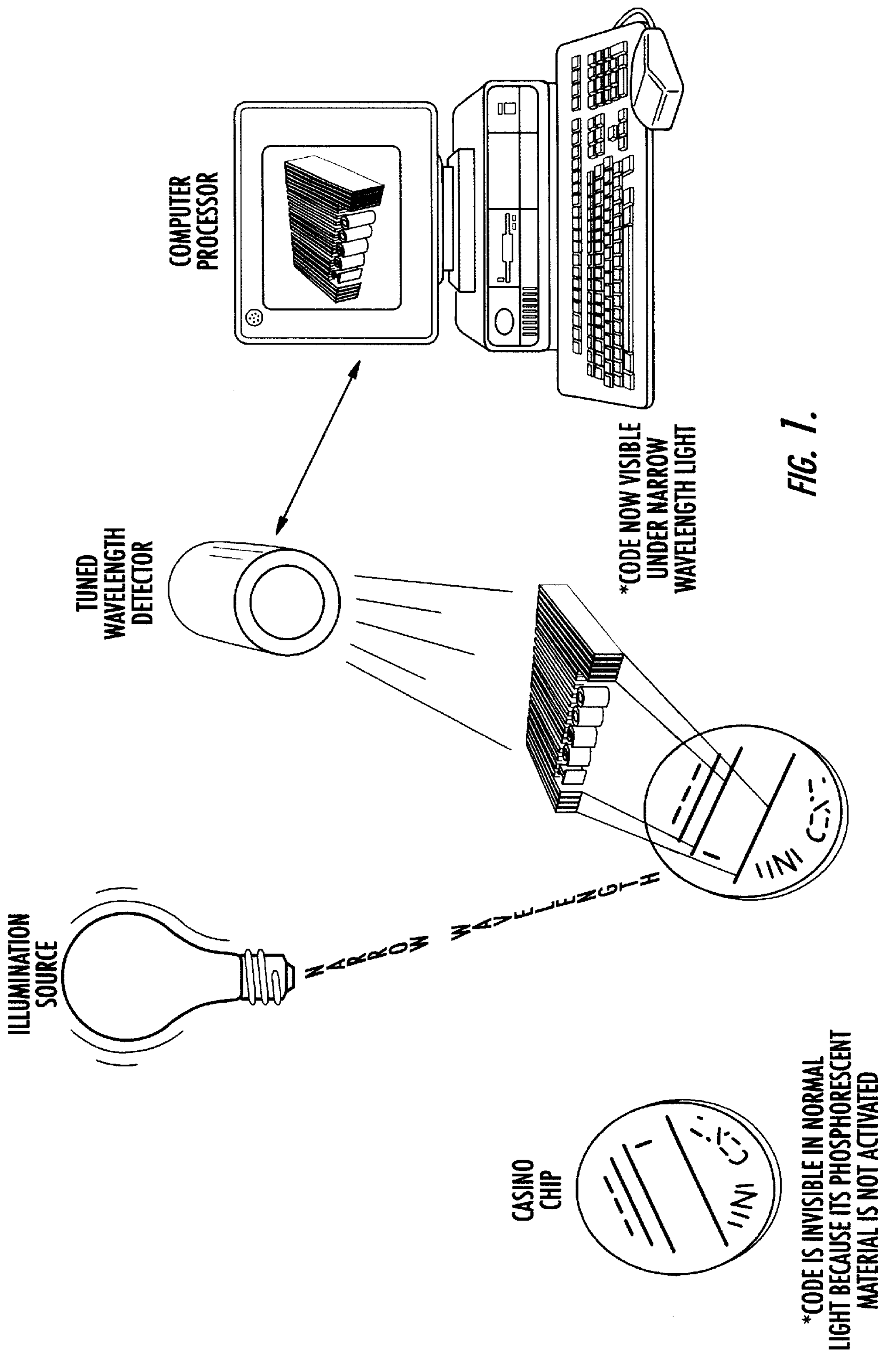
FIG. 1 is a diagrammatic representation of the optical tracking system as applied to casino chips.

As used herein, the phrase "particular or specific wavelength" refers to a single wavelength or a small defined band of the optical spectrum including the adjacent regions of infrared and ultraviolet radiation. These IR and UV "invisible" regions are included because there are often significant advantages for unobtrusive markings.

The term, "illuminator" or "illumination source" as used herein refers to an energy emitter capable of emitting energy at a desired wavelength range. This includes energy outside the visible light spectrum, such as IR, UV, near IR, X-ray, electric, physical, mechanical, sonic, and microwave energies.

The term "target material" as used herein refers to compounds which are applied in readable patterns (alphanumerics, codes, bar codes, including 2-D codes etc.).

The invention relates to an optical tracking system which selectively matches a specific wavelength (or small set of wavelengths, such as a spectrum) of light or other energy used as an illuminator (i.e., an illumination source), with a material sensitive to that illumination. When the material is subjected to the illumination source, it emits a wavelength of energy at the same or different wavelength which is then sensed by a detector. The material can be placed, printed, or applied to an object sought to be identified or tagged. Then, when a reading or verification is desired, the illuminator produces light or other energy at the specified wavelength or spectrum, exciting the material, thus making it visible to the detector.

The invention thus relates to an optical system for tracking or verification of an item having, (a) a material specific to at least one wavelength, (b) an illumination source capable of emitting energy in the wavelength, and (c) a detector capable of detecting the energy emitted by the material.

The invention also relates to a method of tracking or verification of an item by (a) attaching to the item a material specific to at least one wavelength, (b) exposing the material to an illumination source capable of emitting light or other energy in the wavelength, and (c) detecting the light or other energy emitted by the material.

The invention also relates to items or goods marked by the wavelength-specific material. The material contains a pattern such as plain text, or a proprietary or non-proprietary code (such as bar, two-dimensional (2-D) code, or 3-dimensional (3-D) code.

The tracking and verification system has one component dependent on specific wavelengths either as the source or the signal. The system may incorporate 3-dimensional (3-D) writing and reading technology, which by its interdependent nature of excitation and radiation for reading, is highly secure. Although a 3-D writing system has a number of advantages, it will be appreciated that such a 3-D system may not be required or desired in all instances, such as where the need for security is low or cost of application is an important factor.

The 3-Dimensional (3-D) code writing system uses two or more materials applied on top (or substantially) on top of each other. These multiple materials provide security in two ways. First, the two materials can each be read directly, allowing two signals to be read. Second, one material can be used to stimulate other materials in the same 3-D writing (code) which can be designed to radiate narrow and thus secure frequencies.

The tracking and verification system has one component dependent on specific wavelengths either as the source or the signal. The system may also incorporate 3-dimensional (3-D) writing and reading technology, which by its interdependent nature of excitation and radiation for reading, is highly secure.

The material, illuminator, and detector are matched to a particular wavelength or narrow range of wavelengths. Without this matching, the material is either effectively invisible, or the information not useful to someone without the complete tuned (i.e., matched) system.

The material emits light or other energy only when excited by a particular (or small spectrum) wavelength of for example visible or invisible light (short or long wavelength). Since the material is not excited by an energy source (such as an illuminator) out of the spectrum for which it was designed to be excited, it cannot be read or verified by the detector without the energy source (illuminator) present.

The material can be used to apply or print useful information or code. The material can be a blend of different compounds, similar to existing invisible inks. The blending can be varied according to the wavelength desired. The materials can also be compounded by including differing items, including phosphorescing materials, up-conversion phosphors, invisible inks, or combinations thereof.

Turning to FIG. 1, a casino chip can be marked with for example, a phosphorescent material. The chip and phosphorescent material are then subjected to an illuminator (energy source) thereby activating the phosphorescent material. A tuned wavelength detector then "reads" the information contained in the material on the chip, and this information is processed by a computer or other processing device.

In one preferred embodiment, the system incorporates secondary response materials (3D writing). The system can be composed of a first material capable of being excited by one wavelength and emitting energy at another (second) wavelength. This second wavelength is specific to excite a second material applied underneath the first material, which then emits at yet another different wavelength, passing through the first to the detector. This may be termed a "cascade effect."

Figure 2:
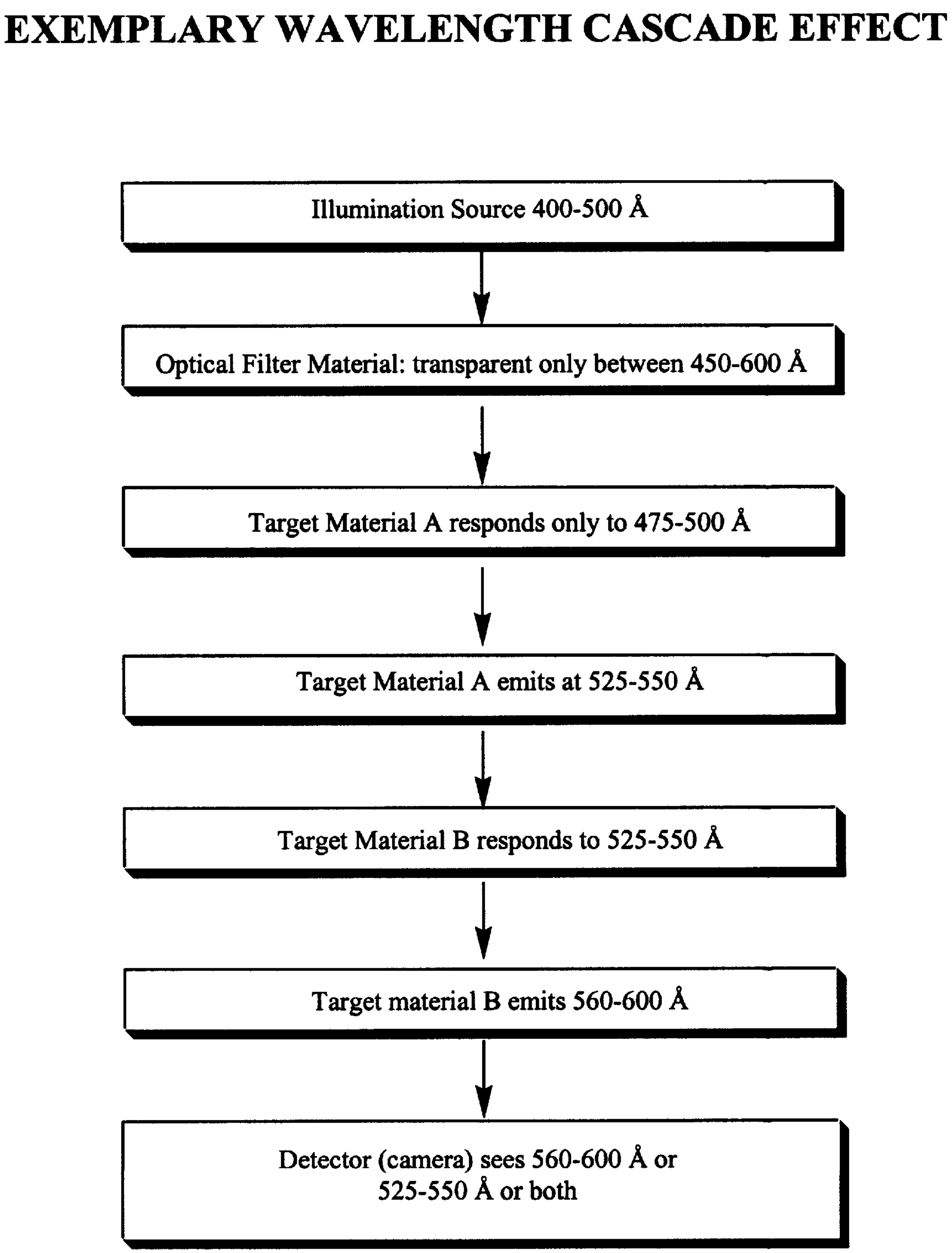
FIG. 2 is a diagrammatical representation of an exemplary wavelength cascade effect.

This cascade effect can be achieved using a variety of methods. Turning to FIG. 2, an exemplary method is as follows. First, an illumination source is provided in the 400–700 Å range. This passes through an optical filter material which is transparent only between 450–600 Å. The first target material ("Target Material A") responds only to 475–500 Å, and in turn emits energy at 525–550 Å. A second target material ("Target material B") responds to energy in the 520–560 Å range, and in turn emits energy at 580–600 Å. A detector such as a camera is set to detect energy in the range of 500–700 Å. A detector filter material which is transparent to 580–600 Å or 525–550 Å (or to both) can be used.

The target materials are compounded, modified, or selected such that when they absorb and re-radiate specific wavelengths in accordance with individual system requirements or designs they provide a unique system. The target material when illuminated at a specific wavelength may re-radiate at the same, a higher or lower wavelength.

The material can be printed or applied in its original state or over-coated with another material to shift the wavelength even more to allow unique illumination and detection. For overcoating, the system would be of similar design to those above except that the illuminator, receiving optics, and electronics are tuned to receive and process only the very narrow wavelength committed to the information block.

The system can be used for virtually any item where individual tracking or verification of items is desired. This includes, but is not limited to, pharmaceutical items (and their packaging), casino chips or tokens, luggage, manufactured goods, or shipment materials (such as UPS, FedEx, Airborne, DHL or U.S. Mail items). It will be appreciated that the tracking system may be used independently or embedded in or operate in conjunction with another system.

The system is very difficult to counterfeit, and serves as an extra safeguard against gray-market items such as perfumes, cosmetics, pharmaceuticals, or alcohol.

It will be appreciated that a 2-dimensional code provides for several billion individual identifications. For additional security, each application can have a special color (wavelength or small spectrum) where the system (material, illuminator and detector) are specifically tuned for that need. Use of a 3-dimensional code affords even more individual identifications for additional security.

The system may be excited by different energy sources such as electric, physical, mechanical, sonic, microwave, or x-ray energies, and whose response is radiated optically. Alternatively, the exciting force can be light and the response given back as different energy sources such as electric, physical, microwave, x-ray or sound.

For example, an electric pulse or magnetic field applied to a material, such as phosphorescent light material, causes radiation in the visible spectrum (after phosphorescent conversion). Additionally, piezoelectric material when excited by pressure can provide the energy to excite a target material to emit a particular wavelength in the optical spectrum. Further, microwave and x-ray energy can be sufficient alone to provide energy to illuminate the target material with enough excitation to re-radiate the desired wavelength. Sound waves may also be used. For example, different frequencies of sound carry significant energy to provide the power if collected by magnetic or piezoelectric systems.

The source (of any spectrum) itself can be tuned by either filtering or the selection of specific compounds. In a similar sense, the energy being radiated by the source can be modified by a filter physically attached to either the excited radiating material or the reading sensor (e.g., camera).

It will be appreciated that the optical materials may be supplied as solutions, solids or suspensions. The materials may be applied by substrate transfer, electrostatic, thermal, reverse thermal, laser, rotogravure or conventional printing. Additionally, the target material may be cured or made to adhere by any process (e.g., dried by evaporation, thermal or UV cured). The target material may further be layered under a material that is reverse printed. The code may be on the external surface, under a transparent or filtered protective layer (which allows only specified wavelengths), or physically bonded in the substrate material).

It will be appreciated that the target material in accordance with the invention may be any material that provides a light to dark contrast between the information that is read over the background. The emitting material may be a combination of two different materials which may alter either the exciting wavelength or the emitting wavelength. The system can also use two or more different excitable materials that would be required to give sufficient contrast in order to be read. These two compounds would not necessarily be the same wavelength.

The code could be composed of portions of the code are read from one material and the balance of the code could be read from another compound.

In a preferred embodiment, the invention relates to an optical system for the tracking or verification of an item having (a) a material specific to at least one wavelength, (b) an illumination source capable of emitting energy in the wavelength, and (c) a detector capable of detecting the energy emitted by the material.

In another preferred embodiment, the invention relates to a method of tracking or verifying an item using the steps of (a) attaching to the item a material specific to at least one wavelength, (b) exposing the material to an illumination source capable of emitting energy in the wavelength, and (c) detecting the energy emitted by the material.

The invention further relates to an object having these wavelength-specific materials, such as anti-counterfeit labels.

The invention also relates to an optical system for the tracking or verification of an item having (a) a first material specific to at least one wavelength; (b) a second material specific to at least one wavelength; (c) an energy source capable of emitting energy in a specific wavelength range; and (d) a detector capable of detecting the energy emitted by the material.

In another embodiment, the invention relates to methods of tracking or verifying an item by (a) providing a first material specific to at least one wavelength, wherein the first material is capable of emitting energy at a specific wavelength; (b) providing a second material specific to at least one wavelength; wherein the second material is capable of emitting energy at a specific wavelength; (c) exposing at least one of the first material and second material to an energy source; and (d) detecting the energy emitted by at least one of the first material and second material. The invention also relates to an object having the wavelength-specific material disposed thereon or therein.

The following examples will serve to further typify the nature of the invention but should not be construed as a limitation on the scope thereof, which is defined solely by the appended claims.

EXAMPLE 1

Casino tokens printed with an organic IR-responsive (sensitive) material were made, having either printed bar codes, alternatively 2-D codes, or alphanumerics. The casino tokens were printed with up to 12 digits with the 2-D code using the IR-responsive organic material.

The printed IR-responsive material was not visible with normal visible illumination, UV illumination, or IR Illumination. The bar code, 2-D code, and alpha numerics were only visible when IR illumination was concentrated around 670 Å and viewed with a camera equipped with a filter allowing only 705 Å–710 Å to pass to the camera detector. No image could be seen with the camera where the light source emitted in the 705 Å–710 Å range. The entire substrate with the printed code appeared red when viewed with the naked eye and when illuminated with the 670 Å source.

Alphanumerics were printed on casino token replicas with cadmium zinc sulfide (CZS) as well as embedded yttrium oxysulfide (YOS), and then illuminated with shortwave UV which allowed the cadmium zinc sulfide and yttrium oxysulfide to be viewed in the visible spectrum. By reducing the amount of CZS or YOS used for the printing and overcoating with water soluble varnish, the image was only visible with the aid of a camera and filter optics to provide sufficient contrast to read the information.

EXAMPLE 2

Paper sheets were printed using an organic IR-responsive material. The paper sheets were printed separately with printed bar codes, 2-D codes, and alphanumerics. Up to 12 digits were printed using the 2-D code and IR responsive organic material.

The printed IR responsive material was not visible with normal visible illumination, UV illumination, or IR Illumination. The bar code, 2-D code, and alpha-numerics were only visible when IR illumination was concentrated around 670 Å and viewed with a camera equipped with a filter allowing only 705 Å–710 Å to pass to the camera detector. No image was seen with the camera when the light source emitted in the 705 Å–710 Å range. The entire substrate with the printed code appeared red when viewed with the naked eye and when illuminated with the 670 Å source. The same technique is used to place a code on plastic sheets.

Alpha numerics are printed on these sheets using cadmium zinc sulfide (CZS) as well as embedded yttrium oxysulfide (YOS) and illuminated with short wave UV. This allowed the cadmium zinc sulfide and yttrium oxysulfide to be viewed in the visible spectrum. By reducing the amount of CZS or YOS used for the printing, and then overcoating with water soluble varnish, the image was only visible with the aid of a camera and filter optics to provide sufficient contrast to read the information.

What is claimed is:

1. An optical system for tracking or verification of an item comprising:

(a) a first material receptive to a first wavelength, the first material emitting a second wavelength when subjected to the first wavelength;

(b) a second receptive to the second wavelength, the second material emitting a third wavelength when subjected to the second wavelength;

(c) an energy source capable of emitting energy in the first wavelength; and (d) a detector capable of detecting the energy emitted in the third wavelength.

2. An object comprising the wavelength-specific material of claim 1.

3. An anti-counterfeit label comprising the wavelength-specific material of claim 1.

4. The system of claim 1, where a second detector detects the second wavelength.

5. A method of tracking or verifying an item comprising:

(a) providing a first material receptive to a first wavelength, wherein said first material emits energy at a second wavelength when subjected to the first wavelength;

(b) providing a second material receptive to the second wavelength, wherein said second material emits energy in a third wavelength when subjected to the second wavelength;

(c) exposing the first material and second material to an energy source in the first wavelength; and (d) detecting the energy emitted in the third wavelength.

6. An object comprising a wavelength specific material of claim 5.

7. The method of claim 5, where a second detector detects the second wavelength.

* * * * *